April 18, 1933.  A. OLDENBURG  1,904,514
PROTECTION FOR ARMATURE WINDINGS
Filed May 1, 1931
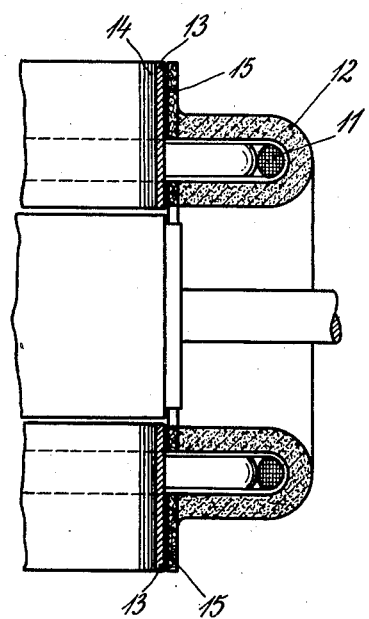
Inventor
Alfred Oldenburg
by Knight Bro
attorneys Patented Apr. 18, 1933

1,904,514

UNITED STATES PATENT OFFICE

ALFRED OLDENBURG, OF BERLIN-CHARLOTTENBURG, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

PROTECTION FOR ARMATURE WINDINGS

Application filed May 1, 1931, Serial No. 534,174, and in Germany May 17, 1930.

My invention relates to improvements in electric motors and more particularly to an arrangement for the protection of the winding of motors.

The ends of the armature coils of the magnetic coil carriers of motors, especially the coils of the stator winding of induction motors are often covered with a protecting mass or compound, by which the protruding ends of the coils are completely sealed against the outside atmosphere. With this method, however, the disadvantage often arises that, owing to the heat developed in service, the copper of the coil ends expands more than the compound does, so that particularly at the place where the compound joins the core end plate of the stator cracks occur, by which the protection afforded by the compound is substantially affected. This disadvantage can, according to my invention, be avoided by affixing an absorbent material to the end surface of the packet of stator laminations, which absorbent material forms an elastic intermediate layer at the joint between the compound and the packet of laminations, so that cracks due to the difference of expansion of the copper of the winding and the compound can no more occur at the joint, even at the occurrence of very great differences of temperature. For this purpose, a fabric, for example of jute or the like, may be employed. Porous plates may also be used. Adhesive substances having a sufficient adhesive strength for this purpose are known. As various compounds, e. g. those produced from derivates of cellulose, also possess a great adhesive strength, it is sometimes not necessary to use special adhesive substances for affixing the said fabrics. By means of the adhesive substances, the fabrics can be made to adhere so strongly to the stator core plate, that they cannot be removed from same without being destroyed. Other elastic intermediate layers may also be used for purposes of that kind, for example. rubber or caoutchouc plates or the like. The latter materials are particularly suitable for use, if the motors in question are much exposed to dirt but in service do not become hotter than permissible for these materials. It is also possible to affix or to press material on all sides round the core end plate serving to hold the thin laminations together, in order to obtain a particularly sure fixing of the intermediate layers placed between the compound and the stator core plate.

An example for carrying out the invention is illustrated in the accompanying drawing. The ends 11 of the coils of the stator winding are completely enclosed by a cap of any kind of suitable insulating mass 12, the composition of which is immaterial for the present invention. Between the cap and the core end plate 13 of the laminated stator 14, an intermediate layer 15 consisting of fabric, e. g. jute or the like, is placed, and tightly united with the end sheet 13 by means of a suitable adhesive compound. The layer of fabric 15 should be very absorbent, so that it combines tightly with the compound cap 12. The cracks often occurring close to the core end plate 13 with the usual method of applying the compound cap 12, owing to the different temperature coefficients, are avoided by the intermediate layers of cloth 15, as the latter retain a certain elasticity at all times, sufficient to follow the movements of the cap.

To increase the adhering surface, the layers of cloth affixed to the core end plates of the stator may be given a suitably corrugated form. Hereby a greater elasticity of the said intermediate layer is obtained.

The invention is particularly suitable for protecting the stator winding of three-phase induction motors, but it can also be applied to advantage for the protection of the winding of other motors or also of electrical apparatus, electromagnets or the like.

I claim as my invention:

1. In an electric motor in combination with a magnetic armature carrier having a winding protruding at the carrier ends and a cap of suitable insulating material at each carrier end completely surrounding the protruding winding ends, of a layer of elastic material disposed between each cap and the pertaining carrier end and being joined firmly to the carrier and the cap for the purpose set forth.

2. In an electric motor in combination with a magnetic armature carrier having a winding protruding at the carrier ends and a cap of suitable insulating material at each carrier end completely surrounding the protruding winding ends, of a layer of absorbent fabric disposed between each cap and the pertaining carrier end and being joined firmly to the carrier and the cap for the purpose set forth.

3. In an electric motor in combination with a magnetic armature carrier having a winding protruding at the carrier ends and a cap of suitable insulating material at each carrier end completely surrounding the protruding winding ends, of an annular layer of elastic material attached to each carrier end and forming the supporting base for the pertaining end cap for the purpose set forth.

4. In an electric motor in combination with a magnetic armature carrier having a winding protruding at the carrier ends and a cap of suitable insulating material at each carrier end completely surrounding the protruding winding ends, of a layer of corrugated fabric disposed between each cap and the pertaining carrier end and being joined firmly to the carrier and the cap for the purpose set forth.

In testimony whereof I affix my signature.

ALFRED OLDENBURG.